United States Patent [19]

Kanfi

[11] Patent Number: 5,642,496
[45] Date of Patent: Jun. 24, 1997

[54] METHOD OF MAKING A BACKUP COPY OF A MEMORY OVER A PLURALITY OF COPYING SESSIONS

[76] Inventor: Arnon Kanfi, 7 Elaine Ct., Randolph, N.J. 07869

[21] Appl. No.: 125,943

[22] Filed: Sep. 23, 1993

[51] Int. Cl.⁶ .................................................. G06F 12/16
[52] U.S. Cl. ................................ 395/489; 395/182.04
[58] Field of Search .................................. 395/488, 489, 395/182.04, 182.05, 183.18

[56] References Cited

U.S. PATENT DOCUMENTS

| | | | |
|---|---|---|---|
| 5,133,065 | 7/1992 | Cheffetz | 395/181 |
| 5,193,154 | 3/1993 | Kitajima et al. | 395/250 |
| 5,212,772 | 5/1993 | Masters | 395/182.18 |
| 5,226,157 | 7/1993 | Nakano et al. | 395/489 |
| 5,241,668 | 8/1993 | Eastridge et al. | 395/182.03 |
| 5,276,860 | 1/1994 | Fortier et al. | 395/182.04 |
| 5,301,286 | 4/1994 | Rajani | 395/412 |
| 5,410,700 | 4/1995 | Fecteau et al. | 395/670 |
| 5,420,996 | 5/1995 | Aoyagi | 395/488 |
| 5,454,099 | 9/1995 | Myers et al. | 395/489 |

*Primary Examiner*—Glenn Gossage
*Attorney, Agent, or Firm*—Watov & Kipnes, P.C.

[57] ABSTRACT

A method is provided for making a backup copy of the content of a memory, e.g., a database, such that the memory is divided into a plurality of segments and a backup copy of individual ones of the segments is made during a respective one of a plurality of independent backup sessions. Each segment may be a predetermined percentage of the memory, and the independent sessions may be separated from one another by a predetermined duration of time, e.g., a day. A full backup of the memory is thus completed during a last one of the backup sessions. An incremental backup copy may be made for each of the blocks of segments whose contents has changed since a previous backup session.

7 Claims, 3 Drawing Sheets

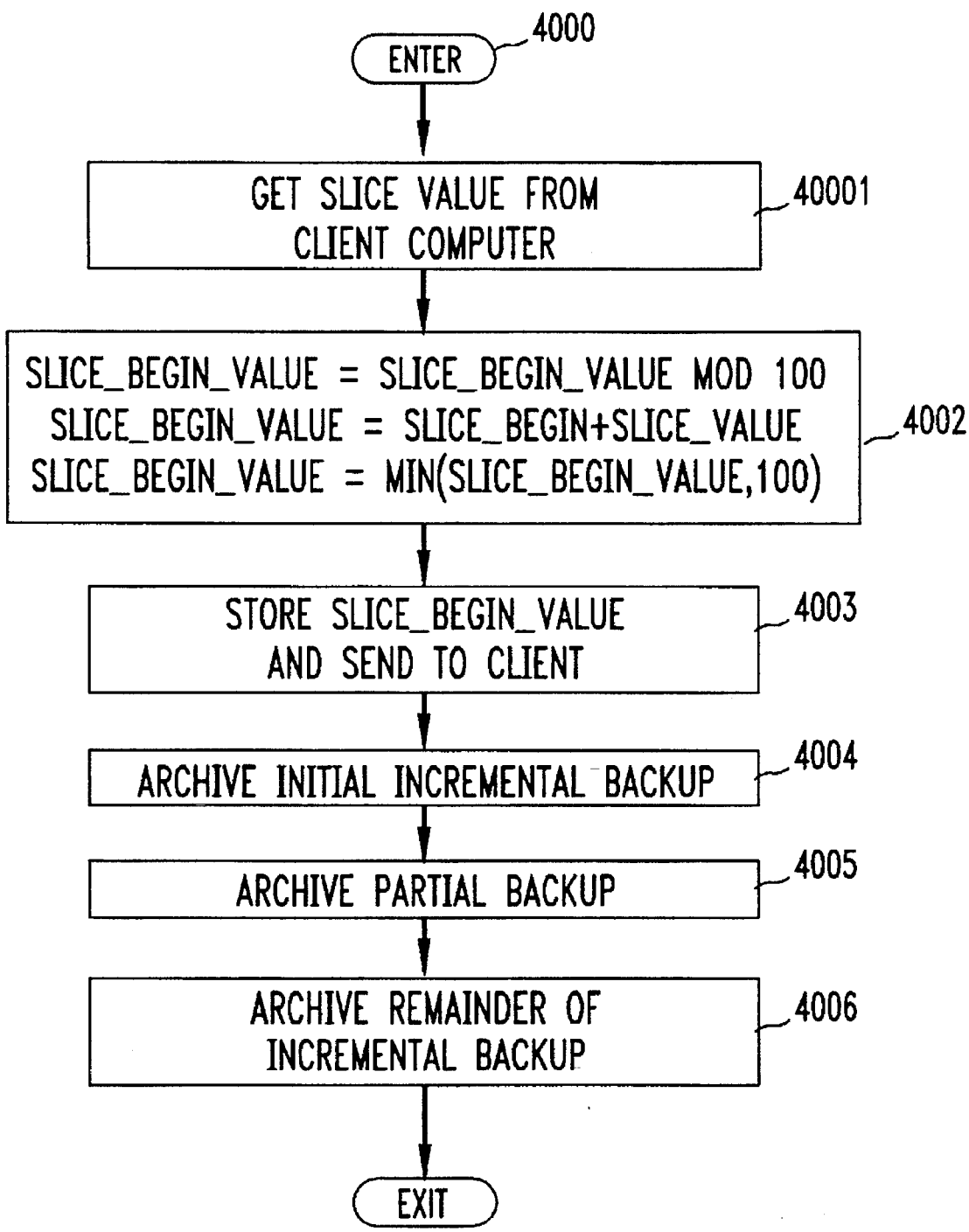

METHOD OF MAKING A BACKUP COPY OF A MEMORY OVER A PLURALITY OF COPYING SESSIONS

FIELD OF THE INVENTION

The Invention relates to computer memory backup arrangements.

BACKGROUND OF THE INVENTION

In computer systems, a copy, or backup, of the contents of memory associated with a computer is periodically made and stored in a so-called backup memory. This is done so that if the computer memory fails, for whatever reason, then the contents of that memory may be restored using the copy stored in the backup memory and using stored copies of computer files which changed since the backup was made. The latter copies are commonly referred to as incremental changes.

It can be appreciated that it takes an appreciable period of time to run (i.e., make) a backup copy of the contents of a very large computer memory, and during that time the associated computer system is typically not used for another purpose, since such use would interfere with the making of the backup copy. As such, a backup session is usually scheduled for a particular period of time sufficient to complete the backup during which the associated computer system is unavailable to users.

SUMMARY OF THE INVENTION

The relevant art is advanced, in accord with the invention, by dividing a memory that is to be copied for backup purposes into a number of segments and making a copy of each such segment during a respective one of a like number of backup sessions, in which each session is of a short duration and in which the sessions are separated in time from one another by a predetermined period of time, e.g., one day. Accordingly, a full backup copy of the memory is obtained as a result of making a backup copy of the last segment during the last one of the backup sessions.

BRIEF DESCRIPTION OF THE DRAWINGS

In the drawings:

FIGS. 3 and 4 illustrate in flow chart form the process which may be used to implement the invention in the system of FIG. 1.

DETAILED DESCRIPTION

Figure 1:
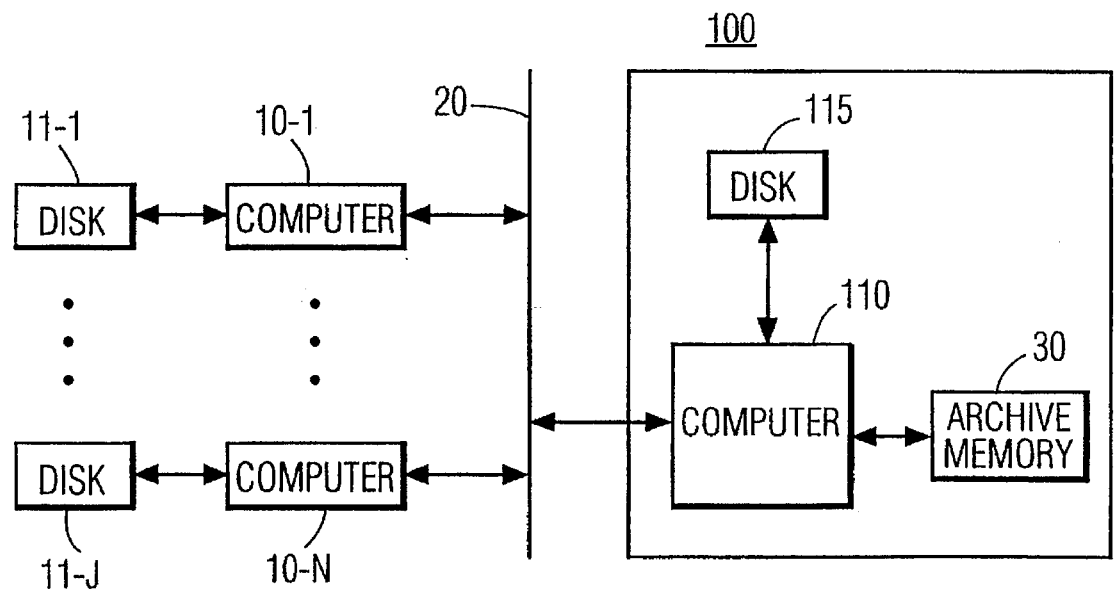
FIG. 1 shows a broad block diagram of a computer archiving system in which the principles of the invention may be practiced.

Turning now to FIG. 1, archiving system 100 includes computer 110, hard disk unit 115 and backup (archive) memory 30. The software which drives system 100 is stored in disk memory 115. Computer 110, which may be, for example, the SPARCSTATION 2 commercially available from Sun Microsystems, Inc. Mountainview, Calif. operates in a conventional manner to periodically poll individual ones of computers 10-1 through 10-N via data network 20. Data network 20 may be, for example, the well-known Ethernet network. Computer 110 invokes such polling on a scheduled basis (e.g., daily, etc.) and does so for the purpose of storing in memory 30 the contents of the memory associated with the computer that is being polled, e.g., computer 10-1. Such contents typically comprise a plurality of named files composed of, for example, data and/or programs, and may be on the order of, for example, forty megabytes to several gigabytes of memory. In an illustrative embodiment of the invention, memory 30 may be, for example, a so-called rewritable-optical-disk library unit (commonly referred to as a "jukebox"). One such "jukebox" is the model OL112-22 unit commercially available from Hitachi, Tokyo, Japan, with each such unit having a number of 644 megabyte (M.B.) optical disk drives that are also commercially available from Hitachi. In the practice of the invention, each of the computers 10-1 through 10-N may be either a personal computer, minicomputer or a large main frame computer. In addition, each of the disk units 11-1 through 11-J may actually be one or more disk units. (Herein each of the designations J and N shown in FIG. 1 is a respective integer.) In addition, the term "file" is taken to mean a program, data, disk partition or contents of a memory including any subset thereof.

Assume at this point that computer 110 is engaged in a memory backup (archiving) session with one of the computers 10-1 through 10-N, e.g., computer 10-1. Also assume that the contents of disk unit 11-1 is sufficiently large such that it will take an appreciable amount of time to make a backup copy of such contents. Disadvantageously, if the backup session lasts, for example, eight or more hours, then computer 10-1 might be unavailable to users for that period of time. (It is noted that in some instances, the making of a full backup could consume 20 or more hours.) As such, full memory backup sessions are not scheduled too often. Although there is a need to make a full backup of computer memory, such a backup should have minimal impact on the users of the associated computer system. Moreover, in accordance with an aspect of the invention, such impact could be greatly minimized by partitioning a full memory backup into a number of partial backups such that a full backup is obtained over a predetermined number of sessions of a short duration, rather than one very long backup session.

Specifically, during each short session a "slice" (or segment) constituting, for example, a predetermined percentage of the total memory that is to be backed up, is obtained and stored in archive memory 30. For example, if a slice happens to be five percent of the total memory, and a partial backup is scheduled daily, then successive slices of the memory are backed up during respective ones of a number of successive days, i.e., twenty days. It is apparent that if the size of a slice is increased or decreased, then the number of short sessions required to obtain a full backup changes accordingly.

Figure 2:
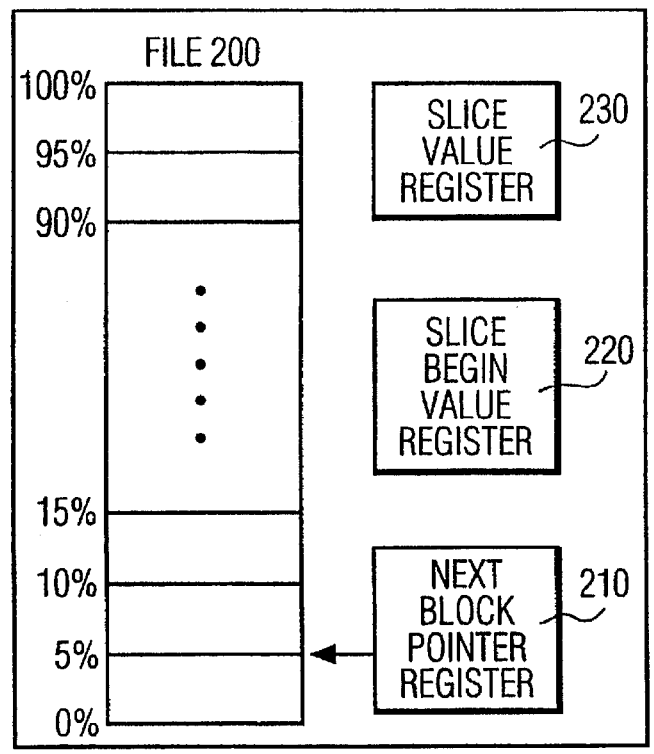
FIG. 2 is an illustrative example of one way in which a memory may be partitioned, in accordance with the principles of the invention, to make partial backup copies of the memory.

FIG. 2 illustrates one example of the way in which the contents of a memory, e.g., disk unit 11-1, (also referred to herein as memory 11-1) may be partitioned, or sliced, for the purpose of making a backup of the memory, in accord with an aspect of the invention. In FIG. 2, it is assumed that each slice represents a particular portion, e.g., five percent, of the total memory 11-1. It is also assumed for brevity and illustrative purposes that the contents of memory 11-1 that will be copied for backup purposes comprises 1000 blocks. As such, archive computer 110 obtains 50 blocks of memory 11-1 via computer 10-1 during each backup session and stores the blocks in associated archive, or backup, memory 30. Specifically, computer 10-1 uses the contents of memory registers 210, 220 and 230 to identify the blocks that are to be acquired and supplied to archive computer 110 via data network 20. In an illustrative embodiment of the invention, registers 210, 220 and 230 may be memory locations internal to 10-1.

Initially, register 210 points to the first block of memory that will be read, i.e., block zero, and is incremented as a block of memory is read so that register 210 points to the next block of memory to be read. Register 220, on the other hand, points to the last block of memory that is to be read (copied) during a particular backup session, and register 230 contains the value of a slice that will be archived during a partial backup, as will be discussed below. Assume, for example, that the slice value (or segment value) is 5%, then register 230 contains that value for a particular memory, e.g., memory 11-1. In an illustrative embodiment of the invention, a different slice value may be used for different memories. For example, the slice value for memory 11-J could be 10%. Thus, when computer 110 requests a partial backup of memory 11-1, a value of 5% is stored in a register 230 associated with computer 10-1 (for a partial backup of memory 11-J, a value of 10% is stored in a register 230 associated with computer 10-N). In addition, the slice value may change for different backup sessions associated with the making of a backup of the same memory. For example, the slice value may increase over successive backup sessions.

Specifically, when computer 110 initiates the first of a number of successive backup sessions for generating a backup of a particular memory, e.g., memory 11-1, it obtains the slice value specified for that memory from the computer associated with that memory, e.g., computer 10-1. Archive computer 110 then uses the slice value to determine a so-called slice-begin value. That is, the latter value is multiplied against the total number of memory blocks and a value of one is then subtracted from that result to identify the last memory block that is to be copied during the current backup session. Computer 110 then supplies the next-slice-begin value to computer 10-1, which stores the value in its associated register 220. For example, if the slice value is 5%, and memory 11-1 comprises 1000 blocks, then 5% of 1000 blocks of memory is 50 blocks. Accordingly, the address of the last block to be copied during the first session is 49 (since the address of the first block is assumed to be zero). When registers 210, 220 and 230 have been so populated, then computer 10-1 unloads a copy of the block of memory 11-1 identified by the contents of register 210 and supplies the block to computer 110 via network 20. Upon receipt of that block, computer 110 stores it in its associated archive memory 30. Computer 10-1 then increments the contents of register 210 to identify the next block of memory to be acquired from memory 11-1. Accordingly, computer 10-1 unloads that block and sends it to computer 110 for storage in archive memory 30. Computer 10-1 proceeds in that manner until it (a) acquires the block of memory associated with address 49, (b) sends that block to computer 110, and (c) increments the contents of register 210, which should contain address 50. Computer 10-1 then stores the contents of registers 210 and 230 in its internal memory (not shown). At that point, computer 110 may then perform a partial backup of one of the other memories 11.

Assuming that a partial backup of memory 11-1 is scheduled daily, then the next day, and when polled by computer 110, computer 10-1 restores the contents of registers 210 and 230. Computer 10-1 then obtains the slice-begin value from computer 110 and stores that value in its associated register 220. Computer 10-1 then adds the contents of register 230 to the contents of register 220. Assuming a slice value of 5% as mentioned above, then the contents of register 220 would equal 10%. Based on the latter value, then the address of the last block memory to be acquired during the current session would be address 99.

Following the foregoing, computer 10-1 obtains from its associated disk memory 11-1 a copy of the block of memory having address 50. Computer 10-1 then supplies that block to computer 110 via data network 20 for storage in archive memory 30. Computer 10-1 then increments register 210 to point to the address of the next memory 11-1 block that is to be read, i.e., block 51; reads that block and supplies it to computer 110 for storage in memory 30. Computers 10-1 and 110 then continue such processing until memory 11-1 blocks 52 through 99 have been read and stored in archive memory 30. Computer 110 then requests from computer 10-1 copies of those blocks of memory 11-1 which changed between the last partial backup and the current partial backup and stores each such block in archive memory 30 upon receipt thereof. (A change in the contents of a block is commonly referred to as an incremental change for backup purposes, and storing a copy of such a block in an archive memory is commonly referred to as an incremental backup.) In an illustrative embodiment of the invention, and as will be discussed below, computer 110 similarly obtains an incremental backup of those blocks having addresses which precede the addresses of the memory blocks which are involved in the current partial-backup session. Then, computer 110 obtains the partial backup and then obtains an incremental backup of those blocks having addresses which exceed the addresses of the memory blocks involved in the current partial backup. Following the foregoing, computers 10-1 and 110 then end the current partial-backup session such that computer 10-1 stores the contents of registers 210 and 230 in its internal memory.

Computers 10-1 and 110 proceed in the described manner during each of the next—illustratively eighteen—partial-backup sessions such that a full backup of memory 11-1 is achieved including incremental changes that occurred between the partial-backup sessions. The partial-backup session following the series of partial back-up sessions then initiates a new series of partial-backup sessions to once again obtain a full backup memory 11-1, if so desired.

During a series of partial-backup sessions, the number of blocks of the memory that is to be copied to obtain a backup thereof may increase or decrease, for whatever reason. Such an increase or decrease is readily dealt with as a result of using register 220. For example, in the above illustrative example, assume that between the initial partial-backup session and the next, or second, partial-backup session the contents of memory 11-1 increased by 200 blocks. As such, the address of the last block of memory 11-1 to be copied for backup purposes would be address 119, rather than address 99. Thus, the number of blocks copied during the second session would increase by 20 blocks to account for the increase in the total number of blocks of memory that need to be copied for backup purposes. The opposite effect would occur if the total number of blocks of memory that need to be copied decreased.

Figure 3:
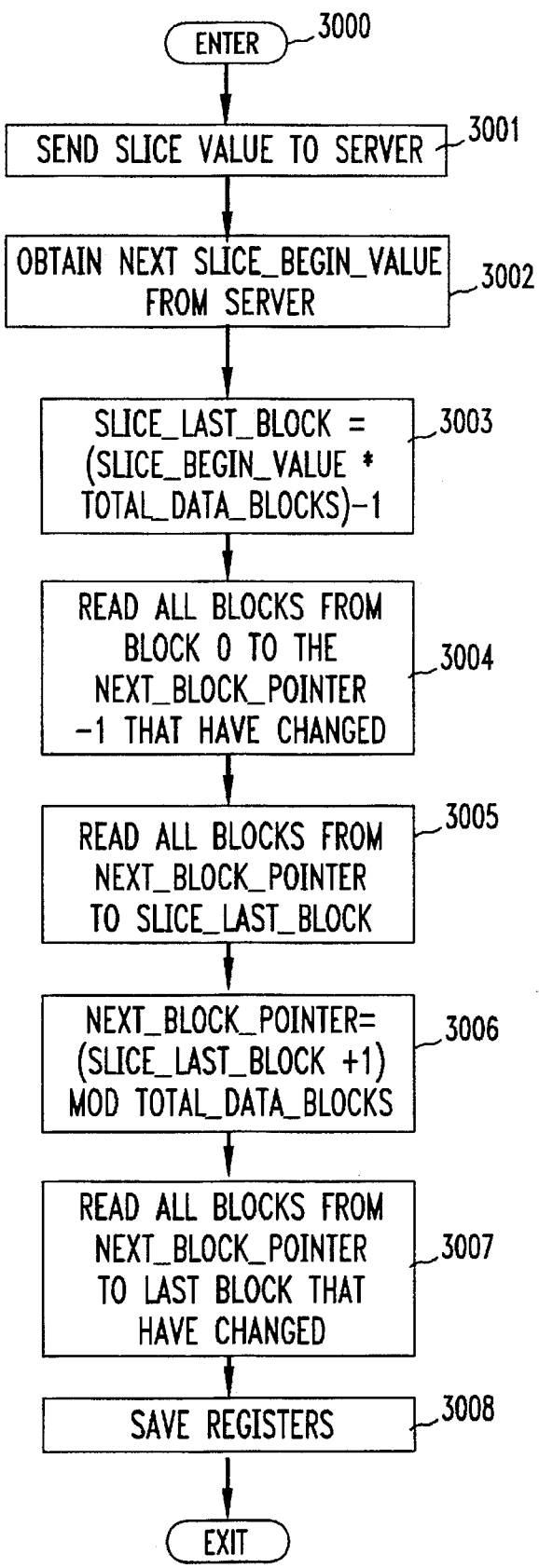

Turning now to FIG. 3, there is shown in flow chart form the process or program which implements the invention in a computer 10, e.g., computer 10-1. Specifically, when computer 10-1 is polled by computer 110, it enters the program at block 3000. The program at block 3000 restores the contents of registers 210 and 230 and then proceeds to block 3001. At block 3001, the program responds to a computer 110 (hereinafter also referred to as server 110) request and supplies the slice value contained in register 230 thereto. The program then proceeds to block 3002 where it requests the next slice_begin_value from server 110. Upon receipt thereof, the program calculates the address of the last memory address that is to be archived (i.e., slice_last_block) for the current partial backup session (block 3003). The program then proceeds to block 3004 where it reads and supplies to server 110 all blocks of memory 11-1 which have changed and whose respective addresses are in the range from address 0 to the address contained in register 220 minus 1. The program then proceeds to block 3005 where it reads and supplies to server 110 those blocks of memory 11-1 that have been targeted for storage in memory 30 during the current partial backup session. That is, computer 10-1 supplies to computer 110 those blocks whose respective addresses are in range characterized by the current contents of register 210 to the value of slice_last_block. The program then proceeds to block 3006 to perform the next part of the incremental backup. At block 3006, the program determines the value of the next_block_pointer as a function of the value of the value of slide_last_block. The program also uses a MOD function to determine if the net value of next_block_pointer is now pointing to the last block in memory 11-1. At block 3007, computer 10-1 reads and supplies to computer 110 as an incremental backup those blocks of memory 11-1 whose respective addresses are in the range characterized by the current value of next_block_pointer to the last block of memory 11-1. The program then proceeds to block 3008 where it stores the current contents of register 210 and the contents of register 230 in the memory 30. The program then exits.

FIG. 4 shows in flow chart form the program which implements the invention in computer 110. In particular, responsive to computer 110 polling a client computer, e.g., computer 10-1, computer 110 enters the program at block 4000 where it reads from its associated memory the slice begin value that was determined for the polled client computer during the previous partial backup session. The program then proceeds to block 4001 where it sends a request to the client computer, e.g., 10-1, requesting the backup slice value for that computer. Upon receipt of that value, the program proceeds to block 4002 to calculate the slice_begin_value which will be used for the current partial backup session and which the client stores in its associated register 220. In particular, the first calculation at block 4002 sets the slice_begin_value to zero if its current value is, e.g., 100%, which would mean that the last partial backup was the last of the series of the partial backups. If the slice_begin_value is not 100%, then it is summed with the slice value at the next line of block 4002. If the result of the latter calculation is greater than 100, then the third line of block 4002 "rounds off" that number to 100. The program then proceeds to block 4003 upon completing such calculations. At block 4003, the program stores the current slice_begin_value and also sends it to the client computer. The program then stores the blocks of memory in archive memory 30 as the blocks are received via network 20 (as represented by program blocks 4004 through 4006, which define the order of the received blocks).

The foregoing is merely illustrative of the principles of the invention. Those skilled in the art will be able to devise numerous arrangements, which, although not explicitly shown or described herein, nevertheless embody those principles that are within the spirit and scope of the invention. For example, although the foregoing was discussed in terms of blocks of memory, it is clear that some other measure of memory may be used in place of block, such as files.

I claim:

1. A method for making a backup copy in an archive memory of at least one computer memory comprised of a number of blocks of memory, comprising the steps of:

partitioning the computer memory into a plurality of segments, each of which constitutes a predetermined percentage of said computer memory;

making individual partial backup copies of the blocks in each of said segments during a respective one of a plurality of spaced intervals separated over periods of time; and making incremental backup copies within each interval of all blocks other than the blocks for which a partial backup copy is made and whose addresses are in a predetermined address range that have changed since the last interval.

2. The method as set forth in claim 1, wherein the steps of making backup copies within each interval for partial and incremental backups together comprise the following steps in the following order:

incrementally backing up changes in blocks of segments preceding the segment for which a partial backup copy is next programmed to be made;

partially backing up the blocks of the segment next programmed for backup; and incrementally backing up changes in blocks of segments following the segment for which a partial backup copy has last been made.

3. The method as set forth in claim 1, wherein the steps of making backup copies are made in the following order within each interval for partial and incremental backups, including the steps of:

partially backing up the blocks of a segment next programmed for such backup;

incrementally backing up changes in blocks of segments preceding the segment for which a partial backup copy has last been made; and incrementally backing up changes in blocks of segments following the segment for which a partial backup copy has last been made.

4. A method as set forth in claim 1, wherein said computer memory is completely backed up after a series of partial backups of segments constituting the entire computer memory, wherein the predetermined percentages of the computer memory may differ from series to series for respectively backing up the entire memory.

5. A method for making a backup copy in an archive memory of a computer memory which includes a plurality of blocks, comprising the steps of:

partitioning the computer memory into a plurality of segments;

making partial backup copies of the blocks in each of the segments within respective spaced intervals that occur in a sequence; and making incremental backup copies within each interval of changes in blocks other than those for which a partial backup copy is made and whose addresses are in a predetermined address range that have occurred since the last interval.

6. The method as set forth in claim 5 wherein the steps of making the backup copies within each interval together comprise the following steps performed in the following order:

first, making an incremental backup copy of changes that have occurred since the last interval, in blocks in the segments having a preceding address in the sequence relative to a given segment;

second, making a partial backup copy of the blocks of the given segment; and third, making an incremental backup copy of changes in blocks in the segments having a succeeding address in the sequence relative to the given segment.

7. The method as set forth in claim 5, wherein the steps of making backup copies within each interval together comprise the following steps performed in the following order:

making a partial backup copy of a given segment;

making an incremental backup copy of changes that have occurred since the last interval, in blocks in segments having a preceding address in the sequence than the given segment; and making an incremental backup copy of changes since the last interval in blocks in segments having succeeding address in the sequence than the given segment.

* * * * *